(12) United States Patent
Lustila et al.

(10) Patent No.: US 6,771,938 B2
(45) Date of Patent: Aug. 3, 2004

(54) HANDSET

(75) Inventors: Risto Lustila, Rovaniemi (FI); Timo Kinnunen, Paavola (FI); Lauri Salomaki, Rovaniemi (FI); Tea Liukkonen-Olmiala, Jaali (FI); Tiina Hynninen, Oulu (FI); Jani Pirkola, Linköping (SE); Leena Sippola, Oulu (FI); Sanna Kaartinen, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 130 days.

(21) Appl. No.: 09/738,718

(22) Filed: Dec. 15, 2000

(65) Prior Publication Data

US 2001/0018332 A1 Aug. 30, 2001

(30) Foreign Application Priority Data

Dec. 15, 1999 (GB) .............................................. 9929673

(51) Int. Cl.[7] .............................................. H04B 1/38
(52) U.S. Cl. .................... 455/90; 455/550; 455/344; 455/74; 455/159.1; 379/376.01
(58) Field of Search ........................ 455/90, 550, 575, 455/344, 74, 157.2, 159.1, 159.2; 379/428.01, 433, 447, 368, 376.01

(56) References Cited

U.S. PATENT DOCUMENTS

| | | | |
|---|---|---|---|
| 4,982,424 A | * 1/1991 | Saito et al. ............ | 379/376.01 |
| 5,237,607 A | 8/1993 | Diamantis .................... | 379/419 |
| 5,912,968 A | 6/1999 | Takebe et al. .............. | 379/435 |
| 5,995,592 A | * 11/1999 | Shirai et al. ................ | 379/56.3 |
| 6,016,038 A | 1/2000 | Mueller et al. ............. | 315/291 |
| 6,150,774 A | 11/2000 | Mueller et al. ............. | 315/291 |
| 6,166,496 A | 12/2000 | Lys et al. .................... | 315/291 |
| 6,201,867 B1 | * 3/2001 | Koike .................... | 379/433.11 |
| 6,211,626 B1 | 4/2001 | Lys et al. .................... | 315/291 |
| 6,269,256 B1 | * 7/2001 | Nakamura .................. | 455/567 |
| 6,292,901 B1 | 9/2001 | Lys et al. .................... | 713/300 |
| 6,297,778 B1 | * 10/2001 | Phillips et al. .............. | 343/702 |
| 6,310,609 B1 | * 10/2001 | Morgenthaler .............. | 345/170 |

FOREIGN PATENT DOCUMENTS

| | | | |
|---|---|---|---|
| EP | 0 414 366 A2 | 2/1991 | |
| EP | 0564 127 A2 | 10/1993 | |
| EP | 0 872 996 A2 | 10/1998 | |
| GB | 2186153 A | 8/1987 | |
| JP | 02231846 | 9/1990 | |
| JP | 11177661 A | * 7/1999 | ............ H04M/1/02 |

* cited by examiner

*Primary Examiner*—Congvan Tran
(74) *Attorney, Agent, or Firm*—Perman & Green, LLP

(57) ABSTRACT

A communications terminal handset having a translucent outer casing and a light source arranged for illumination of a substantial area of the casing.

16 Claims, 2 Drawing Sheets

HANDSET

FIELD OF THE INVENTION

This invention relates to a handset, suitably including means for illumination of its outer cover. The handset may be for a communication terminal such as a mobile telephone.

BACKGROUND OF THE INVENTION

Devices such as radio telephones are being developed to provide users with increasing numbers of features, and features of increasing complexity. In order that users remain able to take advantage of these features there is a parallel need to improve the user interfaces of such devices. User interfaces should be made more simple and more intuitive so that even users who have little technical knowledge remain able to control advanced features of such devices.

As such devices become more commonly used there is also a drive for manufacturers to provide product features that appeal aesthetically to users. Typically, the device has an outer plastic or metal cover whose shape is selected to be aesthetically pleasing. The cover can be pigmented with paint, dye or the like to give it an attractive colour. In addition to the cover, the configuration of other surface parts of the device such as keypads and displays can be selected for eye appeal. However, it can be anticipated that in future demanding purchasers will require more imaginative aesthetic features.

In the field of portable devices, especially handheld devices, there is a strong drive to reduce the devices' size and weight, so that it is easier for users to carry such devices with them all the time. It is preferred that any solution to the other problems described above is compatible with that drive.

It is known for telephones to include a small light that flashes when an incoming call is received. It is known for the individual keys of the keypad of a telephone to be illuminated during use of the telephone.

There is therefore a need for a means whereby the user interface of a device may be enhanced, preferably in conjunction with the provision of additional aesthetic features and preferably without substantial weight or volume increase.

SUMMARY OF THE INVENTION

According to the present invention there is provided a communication terminal handset having a translucent outer casing and a light source arranged for illumination of a substantial area of the casing.

The light source is suitably capable of illuminating the casing in any of a plurality of colours. The light source is suitably capable of illuminating different portions of the casing in different colours. The light source may comprise one or more individual light emitters such as LEDs or fluorescent devices such as fluorescent tubes.

The said substantial area is suitably greater than 30% of the exterior surface area of the handset, preferably greater than 40% of the exterior surface area of the handset and most preferably greater than 50% of the exterior surface area of the handset.

The handset preferably comprises control means for controlling the light source in dependence on a state of the handset. That state may, for example, be any one or more of: whether there is an incoming call to the handset (such a call preferably including a message or voice or data call) and optionally whether that call is unanswered, the detected input to a microphone, a factor internal to the handset and/or the communication terminal such as battery charge or internal temperature, or an external factor such as ambient temperature.

The light source may be controlled so as to vary the colour and/or intensity and/or spatial pattern of illumination of the cover in dependence on the state of the handset, and optionally to vary any of those features over time in dependence on that status.

The illumination of the casing may form part of the user interface of the terminal.

The handset suitably includes diffusion means for diffusing light from the light source for diffuse illumination of said area of the casing. That means may be a rough inner or outer surface of the cover. The handset is suitably arranged so that the illumination of the casing causes emission of light from the handset over a distributed area of the casing, and preferably substantially all the area of the casing.

Not all of the cover need be translucent. One or more regions of the cover may be transparent, for instance where the cover overlaps a display of the terminal. The handset may include other covers, suitably covering other regions of the terminal, or the cover may comprise different non-integral parts covering respective regions of the terminal. The casing preferably does not comprise or overlap any keypad of the terminal.

The casing is preferably rigid. The casing is preferably a protective cover of the terminal. The casing may be a front cover of the terminal. The casing may be user-removable from the terminal.

The terminal is preferably a mobile terminal such as a mobile telephone and/or a cellular telephone.

BRIEF DESCRIPTION OF THE DRAWINGS

The present invention will now be described by way of example with reference to the accompanying drawings, in which.

DESCRIPTION OF THE PREFERRED EMBODIMENT

Figure 1:
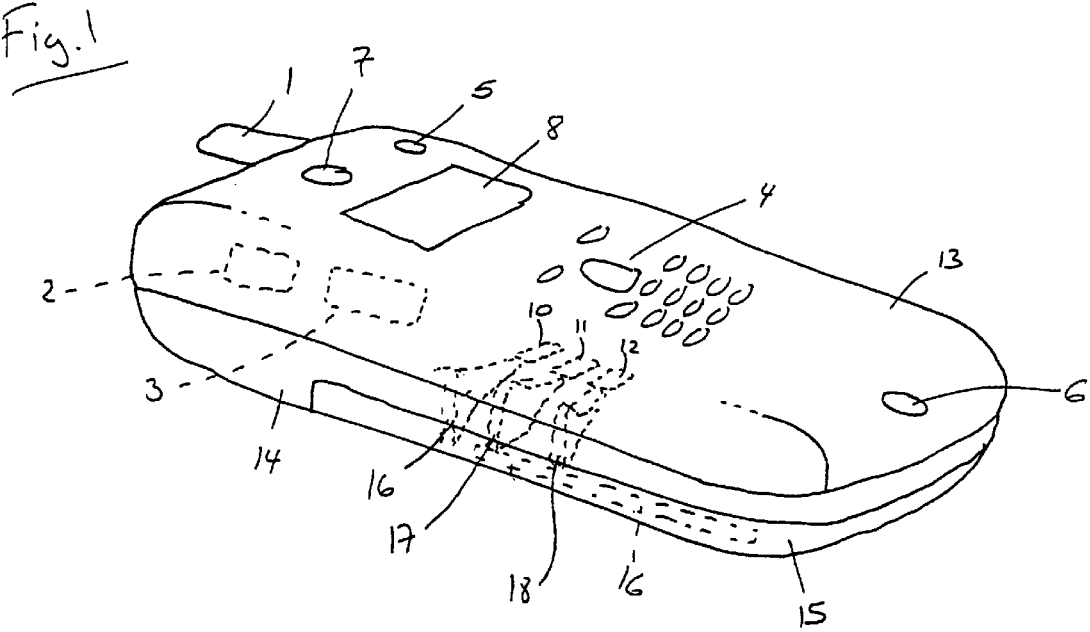
FIG. 1 is a schematic diagram of a mobile terminal.

The mobile terminal of FIG. 1 comprises an antenna 1 connected to a radio interface 2 for transmission and reception of signals from a radio network. A control processor 3 is connected to the radio interface whereby the control processor may provide the radio interface with data for transmission to the network, and may receive data from the network. The control processor is connected to input and output apparatus of the terminal, including keypad 4, ringer 5, microphone 6, loudspeaker 7, visual display 8. The control processor is capable of receiving inputs from the input devices 4 and 6 and providing outputs to the output devices 5, 7 and 8.

The mobile terminal has an outer protective cover in three parts 13–15. Cover part 13 covers the front of the terminal, cover part 14 covers most of the rear of the terminal, and cover part 15 covers the remainder of the rear of the terminal, enclosing the battery 16 which provides the terminal's power source. Together the cover parts enclose most of the components of the terminal, including all the electronic components. The cover parts are formed of translucent plastics material that is capable of diffusing incident light. To achieve this the cover parts may be formed of a non-glassy plastics material, or a plastics material including small particles for light scattering, and/or the inner and/or the outer surface(s) of the cover parts may be rough. In the embodiment of FIG. 1 all the parts of the cover are capable of diffusing incident light, but alternatively only one or two of the cover parts may have that property. It is preferred that at least the front cover part or the main back cover part have that property. It could be that only some regions of any of the cover parts have that property.

The mobile terminal of FIG. 1 also includes a plurality of light emitting diodes (LEDs) 10–12. LED 10 is capable of emitting red light. LED 11 is capable of emitting green light and LED 12 is capable of emitting blue light. Each of the LEDs is coupled to each of the cover parts by a respective light guide 16–18 which guides light from the LED so as to be incident on and led into the bulk of each of the cover parts. Thus, light emitted by any of the LEDs 10–12 can enter each of the cover parts and then be diffused by (in this case) the roughened surface of those cover parts so as to be emitted from the cover parts. The result is that to an observer of the terminal the cover parts themselves appear to glow.

The LEDs 10–12 are driven by control processor 3. By driving the LEDs selectively the control processor can determine the combined colour of light from the LEDs and therefore the apparent colour of the glow of the cover parts as seen by an observer. By altering the drive to each LED over time the control processor can alter the colour and intensity of the apparent glow over time. As will be described below, this feature is used to provide user interface information to a user and to enhance the appearance of the terminal handset.

Examples of the logic that can be used by the control processor to control the LEDs will now be described.

The control processor may drive the LEDs to as to apply a continuous single colour to the cover, for primarily aesthetic purposes. That colour may be selected by the user by means of the keypad of the terminal, for example using a control menu system of the terminal's user interface. Alternatively, a continuously changing pattern of colours may be applied, again selectable by means of the keypad.

It is preferred that the colour applied to the cover is dependant on the state of the terminal. The colour may then give obvious or more subtle feedback to the user as to the status of the terminal. For example:

1. The colour of the cover or the pattern of colours applied to the cover may change when an incoming telephone call is received and is waiting to be answered. The colour of the cover may thus provide an obvious but attractive alert to an incoming call. If the terminal is able to detect the identity of the calling line (CLI) then the colour or pattern when an incoming call is received could be dependant on that identity. Thus the colour/pattern could indicate a characteristic of an incoming message/voice/data call or contact. Such characteristics include its sender, type, content, quality, urgency and/or status. This may also be enabled to occur whilst another call is in progress.
2. The colour of the cover or the pattern of colours applied to the cover may change in dependence on the user's inputs to the keypad or other input means. For example, if the user makes an error in input the cover illumination could give warning of that.
3. The colour of the cover or the pattern of colours applied to the cover may be dependant on inputs received at the microphone 6—for example the volume and/or pitch of the input sounds. Thus, when the user is making a telephone call the colour of the cover could alter in sympathy with his voice.
4. The colour/pattern could be indicative of the target or quality of a direct link (e.g. via infra red or radio) to another unit.
5. The colour/pattern may be dependant on the content of a message received. In this way users could pass messages between each other using predetermined colour codes. Similarly, a sequence of colours shown near a door or other sensor could allow a user access to a secure area.
6. The colour/pattern could be dependant on a sensed environmental or internal parameter such as temperature, humidity, type, urgency, charge level of the terminal's battery, speed, distance from base station, radiation, gas concentration, security level or duration of connection.

The cover illumination may thus form part of the user interface of the terminal—specifically an output means of the user interface of the terminal.

The cover may be illuminated by other means. For example, fluorescent tubes could be used instead of LEDs. Fibre optic light guides could be used to guide the light to the cover and if allowed to leak in the region of the cover, to provide distributed illumination over it. Instead of red, green and blue fewer and/or different colours may be used. Instead of using dedicated coloured emitters the desired colours may be formed by means of one or more filters. Other options include ASP sapphire (http://www.otn.net/sapphirelight/).

Figure 2:
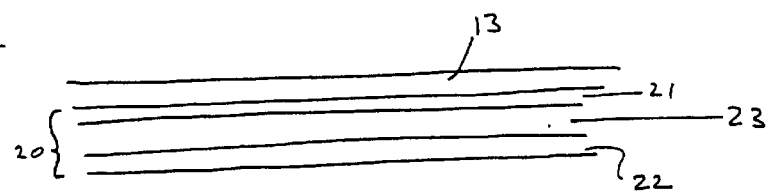
FIGS. 2 to 4 illustrate means of illumination of the cover of a mobile terminal.

Instead of individual LEDs one or more light emitters having themselves a larger surface area could be used. Such an emitter could be arranged on the inner surface of the cover. FIG. 2 shows a cross-section through part of a cover having an emitter 20 disposed on its inner surface. The emitter 20 includes a pair of electrodes 21, 22 and a light-emitting layer 23 between them which extends over at least a substantial part of the inner surface of the cover.

Figure 3:
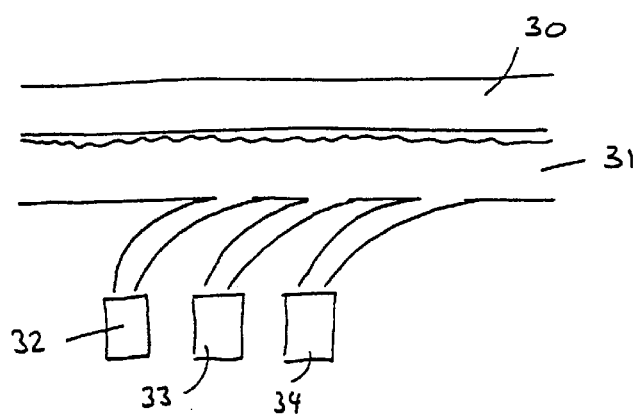

FIG. 3 shows an arrangement in which the cover comprises a transparent protective and durable outer shell 30 which includes no diffusion means, and an interior light diffusion layer 31 which receives light from LEDs 32–34. Light diffused by layer 31 passes through transparent shell 30 without further diffusion.

Figure 4:
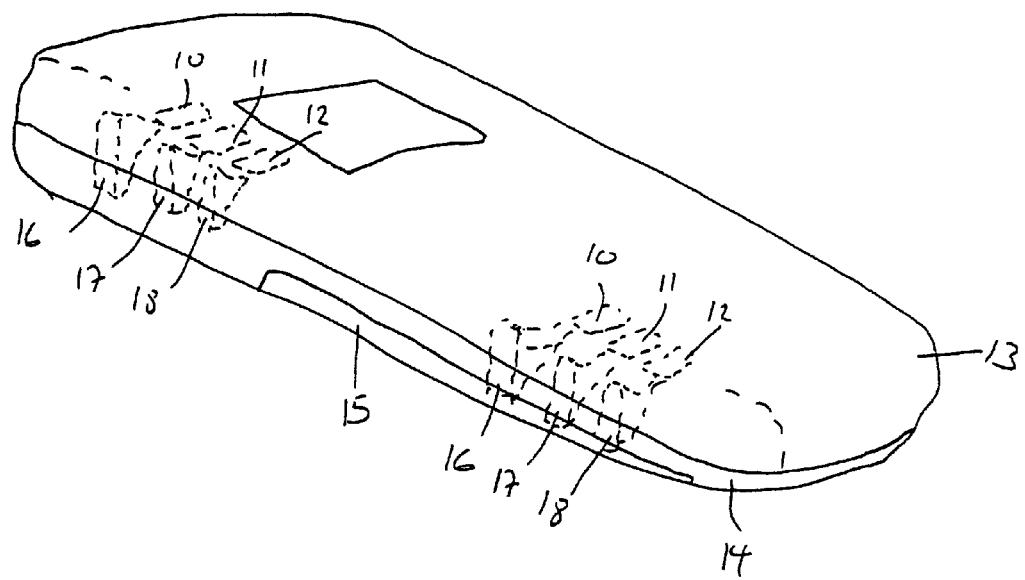

FIG. 4 shows an arrangement in which there are a plurality of groups of LEDs coupled to the covers at different locations. In the arrangement of FIG. 4 the colour of the cover can be different at different locations because of the reduction in the intensity of emission from the cover due to a particular LED with increasing distance from the point at which it is coupled to the cover. In the arrangement of FIG. 4 the control processor can control the apparent colour of the cover to be different at different locations on the cover. With a change in colour over time this can provide for attractive effects of changing or pulsating colours moving or merging over the cover. These patterns may be used in any of the ways described above for providing information to a user or altering the appearance of the terminal. More than two sets of light sources coupled to the display at different locations may be used.

Static multicolour surfaces may be achieved by using prisms, coloured stickers, templates or the like on the cover to enhance the illuminated effects.

Instead of illuminating all parts of the cover, only one or some parts of the cover, preferably including the front cover, could be illuminated. The illumination preferably excludes any parts of the cover overlying the display. Nevertheless, such parts are likely to be transparent and smooth-surfaced, so light within the cover is unlikely to leak from such parts. Illumination could extend away from the handset—especially when the handset is placed on a surface such as a table.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A communications terminal handset comprising:

a keypad;

a translucent outer casing;

a light source arranged for illumination of a substantial area of the casing, wherein the light source is capable of illuminating different portions of the casing in different colours; and control means for controlling the light source in dependence on a state of the telephone handset.

2. A communications terminal handset as claimed in claim 1, wherein the light source is capable of illuminating the casing in any of a plurality of colours.

3. A communications terminal handset as claimed in claim 1, wherein the said substantial area is greater than 30% if the exterior surface area of the handset.

4. A communications terminal handset as claimed in claim 1, wherein the control means is capable of controlling the light source in dependence on whether there is an incoming unanswered call to the telephone handset.

5. A communications terminal handset as claimed in claim 1, wherein the control means is capable of controlling the light source in dependence on a sensed environmental or internal factor of the telephone.

6. A communications terminal handset as claimed in claim 1, including diffusion means for diffusing light from the light source for diffuse illumination of the said area of the casing.

7. A communications terminal handset as claimed in claim 6, wherein the light source comprises a plurality of light generators.

8. A communications terminal handset as claimed in claim 7, wherein each light generator is a light emitting diode.

9. A communications terminal handset as claimed in claim 7, including a plurality of light guide means, each for guiding light from a respective light generator to the casing.

10. A communications terminal handset as claimed in claim 9, wherein at least one of the light guide means is arranged for optical connection to the casing at a location spaced from that at which another of the light guide means is arranged for optical connection to the casing.

11. A communications terminal handset comprising:

a keypad;

a translucent outer casing; and a light source controlled by the communications terminal for causing a substantial area of the casing to emit light, wherein the light source causes different portions of the casing to emit light in different colours, and wherein the light source is controlled in dependence on a state of the telephone handset.

12. The handset of claim 11, wherein the light source causes the casing to emit light in any of a plurality of colours.

13. The handset of claim 11, wherein the light source includes a plurality of light generators.

14. The handset of claim 13, wherein each of the plurality of light generators is a light emitting diode.

15. The handset of claim 14, further comprising a plurality of light guide means, each for guiding light from a respective light generator to the casing.

16. The handset of claim 14, wherein at least one of the light guide means is arranged for optical connection to the casing at a location spaced from that at which another of the light guide means is arranged for optical connection to the casing.

* * * * *